US006669561B2

(12) United States Patent
Sunaga et al.

(10) Patent No.: US 6,669,561 B2
(45) **Date of Patent: *Dec. 30, 2003**

(54) GAME MACHINE

(75) Inventors: Isao Sunaga, Tokyo (JP); Hiroyuki Danjo, Tokyo (JP); Yukinori Inamura, Tokyo (JP)

(73) Assignee: Universal Sales Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/309,963

(22) Filed: Dec. 4, 2002

(65) Prior Publication Data

US 2003/0083124 A1 May 1, 2003

Related U.S. Application Data

(63) Continuation of application No. 09/014,816, filed on Jan. 28, 1998, and a continuation-in-part of application No. 09/012,115, filed on Jan. 22, 1998, now Pat. No. 6,206,781, which is a continuation-in-part of application No. 08/919,016, filed on Aug. 27, 1997, now Pat. No. 6,106,393.

(51) Int. Cl.[7] .................................................. A63F 13/00
(52) U.S. Cl. .......................................... 463/20; 463/16
(58) Field of Search ..................................... 463/16–20

(56) References Cited

U.S. PATENT DOCUMENTS

| | | | | |
|---|---|---|---|---|
| 4,993,713 A | * | 2/1991 | Harada | 463/25 |
| 5,074,559 A | * | 12/1991 | Okada | 463/21 |
| 5,131,655 A | * | 7/1992 | Ugawa | 273/121 B |
| 5,277,424 A | * | 1/1994 | Wilms | 463/12 |
| 5,609,524 A | * | 3/1997 | Inoue | 463/20 |
| 5,722,891 A | * | 3/1998 | Inoue | 463/20 |
| 5,954,422 A | * | 9/1999 | Marchini et al. | 362/227 |
| 6,077,163 A | * | 6/2000 | Walker et al. | 463/26 |

FOREIGN PATENT DOCUMENTS

| | | | |
|---|---|---|---|
| JP | 05-57044 | * | 3/1993 |
| JP | 08-005981 | * | 1/1996 |
| JP | 08-52260 | * | 2/1996 |
| JP | 09-38682 | * | 2/1996 |

* cited by examiner

*Primary Examiner*—John M. Hotaling, II
(74) *Attorney, Agent, or Firm*—Choate, Hall & Stewart

(57) ABSTRACT

A game machine according to the present invention is characterized in that it comprises: a coin inlet for inserting coins; a selector for differentiating whether or not a coin inserted via the coin inlet is a valid coin; a hopper for collecting coins determined by the selector to be valid coins and discharging the collected coins according to requirements; a coin input counting section for counting the number of coins determined by the selector to be valid coins; a rate changing switch for switching between a plurality of game rates; and a game implementing section for implementing a game at the game rate set by this rate changing switch.

37 Claims, 10 Drawing Sheets

| | RATE | 1st COIN | 2nd COIN | 3rd COIN |
|---|---|---|---|---|
| 7 7 7 | $1 | 800 | 1600 | 2500 |
| | C50 | 400 | 800 | 1600 |
| | C25 | 200 | 400 | 800 |
| BAR BAR BAR / BAR BAR BAR / BAR BAR BAR | $1 | 80 | 160 | 280 |
| | C50 | 40 | 80 | 160 |
| | C25 | 20 | 40 | 80 |
| BAR BAR / BAR BAR / BAR BAR | $1 | 40 | 80 | 200 |
| | C50 | 20 | 40 | 80 |
| | C25 | 10 | 20 | 40 |
| BAR / BAR / BAR | $1 | 20 | 40 | 100 |
| | C50 | 10 | 20 | 40 |
| | C25 | 5 | 10 | 20 |
| | $1 | 20 | 40 | 100 |
| | C50 | 10 | 20 | 40 |
| | C25 | 5 | 10 | 20 |
| ANY BAR / ANY BAR / ANY BAR | $1 | 10 | 20 | 50 |
| | C50 | 6 | 12 | 20 |
| | C25 | 3 | 6 | 12 |
| ANY 2 | $1 | 10 | 20 | 40 |
| | C50 | 6 | 12 | 20 |
| | C25 | 3 | 6 | 12 |
| ANY 1 | $1 | 8 | 16 | 25 |
| | C50 | 4 | 8 | 16 |
| | C25 | 2 | 4 | 8 |

GAME MACHINE

CROSS REFERENCE TO RELATED APPLICATIONS

This application is a continuation of U.S. patent application Ser. No. 09/014,816, filed Jan. 28, 1998, (pending), which itself is a continuation-in-part of U.S. patent application Ser. No. 08/919,016, filed Aug. 27, 1997 (now U.S. Pat. No. 6,106,393), and a continuation-in-part of U.S. patent application Ser. No. 09/012,115, filed Jan. 22, 1998, (now U.S. Pat. No. 6,206,781), the contents of all of which are incorporated herein by reference.

FIELD OF THE INVENTION

The present invention relates to a game machine, and more particularly to a game machine such as a slot machine, poker game machine, or the like, whereby a game is played by inserting coins.

BACKGROUND

Conventionally, game machines such as slot machines or poker game machines, which pay back coins according to the prize status of the game results, have been very popular and are widely used. A slot machine is described here as one example of a game machine.

After inserting a coin into the slot machine, the player starts the game by operating a start lever, for example. The slot machine causes a plurality of reels (for example, three reels) bearing numerous types of symbols on the circumference thereof to rotate at high speed, and it determines the prize status according to the combination of symbol marks on the reels which appear in prescribed window positions when the reels are stopped. The number of tokens paid out is determined by the combination of symbols when the reels have stopped, in other words, the prize status.

Slot machine prizes include "big jackpots," where 1000 or more tokens, for example, are paid back, and so-called "small jackpots." The player plays the slot machine in anticipation of increasing the number of tokens in the player's possession, but since the number of tokens in the player's possession does not increase significantly with "small jackpots," the player plays the slot machine while hoping for a "big jackpot" that will quickly increase the number of tokens in the player's possession.

In one type of slot machine, the prize status is determined by random selection using random numbers for each game. This type of slot machine is described below.

In the type of slot machine in which the prize status is determined by random selection using random numbers for each game, for example, the prize status is randomly selected when a token is put into the slot machine and the start lever is pulled, and the current game prize status is determined. When the current game prize status has been determined, the reels are rotated to begin the game.

However, among the types of slot machines in which the prize status is determined by random selection using random numbers for each game, there are those in which the player can stop the reels by operating a stop button provided in the slot machine. In this type of slot machine, the reels are not immediately stopped according to the timing by which the player operates the stop button, but are instead stopped when the reel symbols appear at the locations corresponding to the prize status previously determined by random selection.

However, when too long a time passes until the reels stop after the player has operated the stop button, unnatural reel stopping operations can result, and the reels can be stopped regardless of the prize status previously determined by random selection. Accordingly, there can be cases where the prize status might end up as a "lose" due to the timing with which the player actuates the stop buttons, even when the prize status previously determined by random selection would have been a "big jackpot."

Among the types of slot machines in which the prize status is determined by random selection using random numbers for each game, there are also those in which no stop button is provided to stop the reels, but the reels are automatically stopped by a control in the slot machine. In this type of slot machine, the reels are stopped when the reel symbols appear at the position corresponding to the prize status previously determined by random selection after the reels have rotated for a specific period of time.

In a game machine wherein coins are inserted in order to play a game, a selector is used for sorting the coins inserted and ejecting coins of the wrong shape, such as invalid coins or false coins, and a hopper is used for discharging coins paid back according to the game results. The structure of the selector and the hopper depend on the thickness and diameter of the coins.

Needless to say, there is a difference in size between a 25 cent coin and a dollar coin, for example, and it is not possible to handle both these types of coin using a single type of selector or hopper. However, in a casino, for example, there are many different categories of customer, including, for example, those who want to play games which bet 25 cents a turn (hereafter, called "25 cent rate game"), and those who want to play games which bet 1 dollar a turn (hereafter, "1 dollar rate game"). Therefore, in outlets targeted at a variety of customers, it is necessary to provide, for example, two types of game machine: those taking 25 cent coins, and those taking 1 dollar coins.

SUMMARY OF THE INVENTION

The present invention was devised in view of the foregoing, an object thereof being to provide a game machine whereby it is possible to play, for example, a game betting 25 cents a turn and a game betting one dollar a turn, in a single game machine.

In a game machine wherein coins are inserted and a game can be played by placing these coins as a bet, a game machine according to the present invention is characterized in that it allows a game betting a unit value that is different from the value of one of the inserted coins to be played.

Furthermore, in a game machine described herein, a game machine according to the present invention is characterized in that the unit value that is different from the unit of the inserted coin is smaller than the value of one of the inserted coins.

Furthermore, in a game machine wherein coins are inserted and a game is played by placing these coins as a bet, a game machine according to the present invention is characterized in that games can be played at a plurality of game rates, while the type of coin inserted is one type only.

A game machine according to the present invention is characterized in that it comprises: a coin inlet for inserting coins; a selector for differentiating whether or not a coin inserted via the coin inlet is a valid coin; a hopper for collecting coins determined by the selector to be valid coins and discharging the collected coins according to requirements; a coin input counting section for counting the number of coins determined by the selector to be valid coins; a rate changing switch for switching between a plurality of game rates; and a game implementing section for implementing a game at the game rate set by this rate changing switch.

Furthermore, in one embodiment of a game machine described herein, a game machine according to the present invention is characterized in that the rate changing switch is provided in a position whereby it can be operated by the player such that the player can change the game rate.

Furthermore, in one embodiment of a game machine described herein, a game machine according to the present invention is characterized in that the game is a game which pays back coins at a specified prize probability, and the specified prize probability changes in accordance with the game rate, which may be changed by means of the rate changing switch.

Moreover, in another embodiment of a game machine described herein, a game machine according to the present invention is characterized in that the prize probability which changes in accordance with the game rate increases as the game rate increases.

A game machine according to the systems and methods described herein may include a game machine into which coins are inserted and a game can be played by placing these coins as a bet, wherein the game machine allows a game by betting a unit value different from the value of one of the inserted coins to be played. The unit value which is different from the unit of the inserted coin may be smaller, or larger, than the value of one of the inserted coins.

A game machine according to the systems and methods described herein may include a game machine into which coins are inserted and a game is played by placing these coins as a bet, wherein the game machine can be played at a plurality of game rates, while the type of coin inserted is one type only.

A game machine according to the systems and methods described herein may comprise: a coin inlet for inserting coins; a selector for differentiating whether or not a coin inserted via the coin inlet is a valid coin; a hopper for collecting coins determined by the selector to be valid coins and discharging the collected coins according to requirements; a coin input counting section for counting the number of coins determined by the selector to be valid coins; a rate changing switch for switching between a plurality of game rates; and a game implementing section for implementing a game at the game rate set by the rate changing switch. The rate changing switch may optionally be provided in a position so it can be operated by the player such that the player can change the game rate. The game may pay back coins at a specified prize probability that changes in accordance with the game rate, which may be changed by means of the rate changing switch The prize probability which changes in accordance with the game rate may increase, decrease, stay the same, or some functional combination thereof, including, for example, a linear increase followed by a flat level, as the game rate increases.

A game machine according to the systems and methods described herein may comprise: an inlet, having an opening for receiving value units inserted by a player; a token input counting section, responsive to the number of value units inserted into the inlet; a rate changing switch for switching between a plurality of game rates; and a game implementing section responsive to the rate changing switch and to the token input counting section. The opening on the inlet may be sized to receive coins, printed bills, tokens, or some combination or variation thereof. Multiple openings of different sizes may be provided on the inlet. A selector may be coupled to the inlet for determining whether or not a value unit inserted via the opening in the inlet is a valid value unit. The rate changing switch may be operable by a player. The game machine may further comprise: a prize determination device for determining whether the player has won a prize; a hopper, coupled to the inlet and responsive to the prize determination device, for collecting value units and discharging none or more of the collected value units depending on the prize result determined by the prize determination device. The prize determination device may pay back value units at a predetermined prize probability responsive to the rate changing switch. The prize probability may increase, decrease, stay flat, or some combination or variation thereof, such as for example, a linear increase, as the game rate increases.

A method of playing a game according to the systems and methods described herein may include: receiving value units inserted by a player; counting the number of value units received; selecting a game rate from among a plurality of game rates; and implementing the game at the game rate selected based on the number of value units received. Counting may include counting the number of valid value units received. Such a method may further include determining whether a value unit received is a valid value unit, determining whether the player has won a prize, and/or collecting value units and discharging none or more of the collected value units depending on the prize result determined. Selecting a game rate may include providing a player-operable switch for selecting a game rate from among a plurality of game rates. Determining may include determining at a predetermined prize probability depending on the game rate selected. Determining may include determining at a predetermined prize probability that increases, such as, for example, linearly, as the game rate selected increases.

A method of playing a game according to the systems and methods described herein may further include: providing a predetermined game result; rotating a plurality of reels; stopping the reels at a position that varies according to the predetermined game result; and indicating the predetermined game result prior to all of the reels coming to a stop by actuating at least one reel light that is coupled to at least one of the reels. Such a method may further comprise extinguishing the coupled reel light when the corresponding reel stops and the predetermined game result does not include one of: "big jackpot" and "one shy".

DETAILED DESCRIPTION OF PREFERRED EMBODIMENTS

Below, the present invention is described with reference to the drawings.

Figure 1:
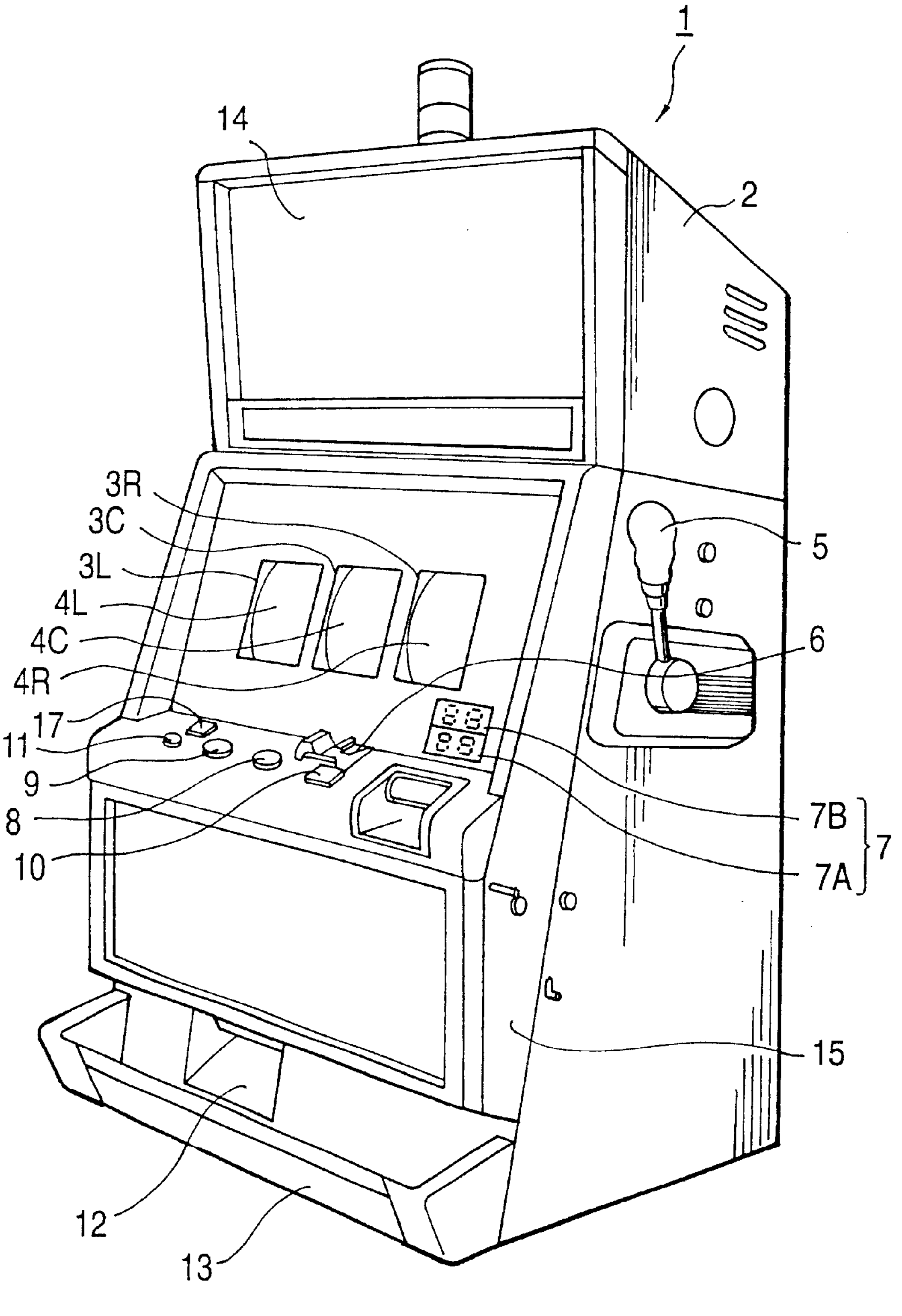
FIG. 1 is an external view of one embodiment of a slot machine according to the present invention.

Here a case where the present invention is applied to a slot machine, which is one example of a slot machine, is described. FIG. 1 is an external view of one embodiment of a slot machine according to the present invention.

In FIG. 1, a slot machine main unit 1 is shown. The front face of a cabinet 2 constituting the entire main unit 1 is provided with windows 3L, 3C, 3R corresponding to the number of reels (in the case of FIG. 1, three reels), for viewing symbols on a set of reels 4L, 4C, 4R located inside the cabinet 2. A start lever 5 for causing the reels 4L, 4C, 4R to rotate when operated by a player is rotatably attached at a prescribed angle on the side face of the cabinet 2.

A coin inlet 6 for inserting coins and a digital display 7 are provided on the lower right side of the windows, 3L, 3C, 3R on the front face of the cabinet 2. The digital display 7 comprises a credit number display 7A for displaying the number of coins currently in credit, and a converted credit number display 7B for displaying the number of coins currently in credit when converted to the current game rate.

Furthermore, on the front face of the cabinet 2 below the windows 3L, 3C, 3R, there are also provided: a spin switch 8 for setting the reels in motion by operation of a push button, which is independent of the operation of the start lever 5; a single bet switch 9 for betting just one of the coins in credit on the game when a push button is pressed once; a maximum bet switch 10 for betting the maximum number of coins which can be bet on a single game when a push button is pressed once; a C/P switch 11 whereby the player can switch between credit and pay out of accumulated coins by operating a push button; and a coin receptacle 13 for collecting coins paid out from a coin pay outlet 12 on the lower front face of the main unit 1 when the C/P switch 11 is operated.

A display panel 14 showing the winning symbol combinations and a prize allocation table, or the like, is provided on the upper front face of the main unit 1. A front door panel 15 is provided, which can be opened and closed with respect to the main unit 1 for the purpose of inspecting and servicing the internal parts of the main unit 1, collecting and supplying coins, and the like. The windows 3L, 3C, 3R for viewing the reels 4L, 4C, 4R located in the main unit 1 are provided in the front door panel 15. A rate changing switch 17 also is provided, and is described in detail later.

Figure 2:
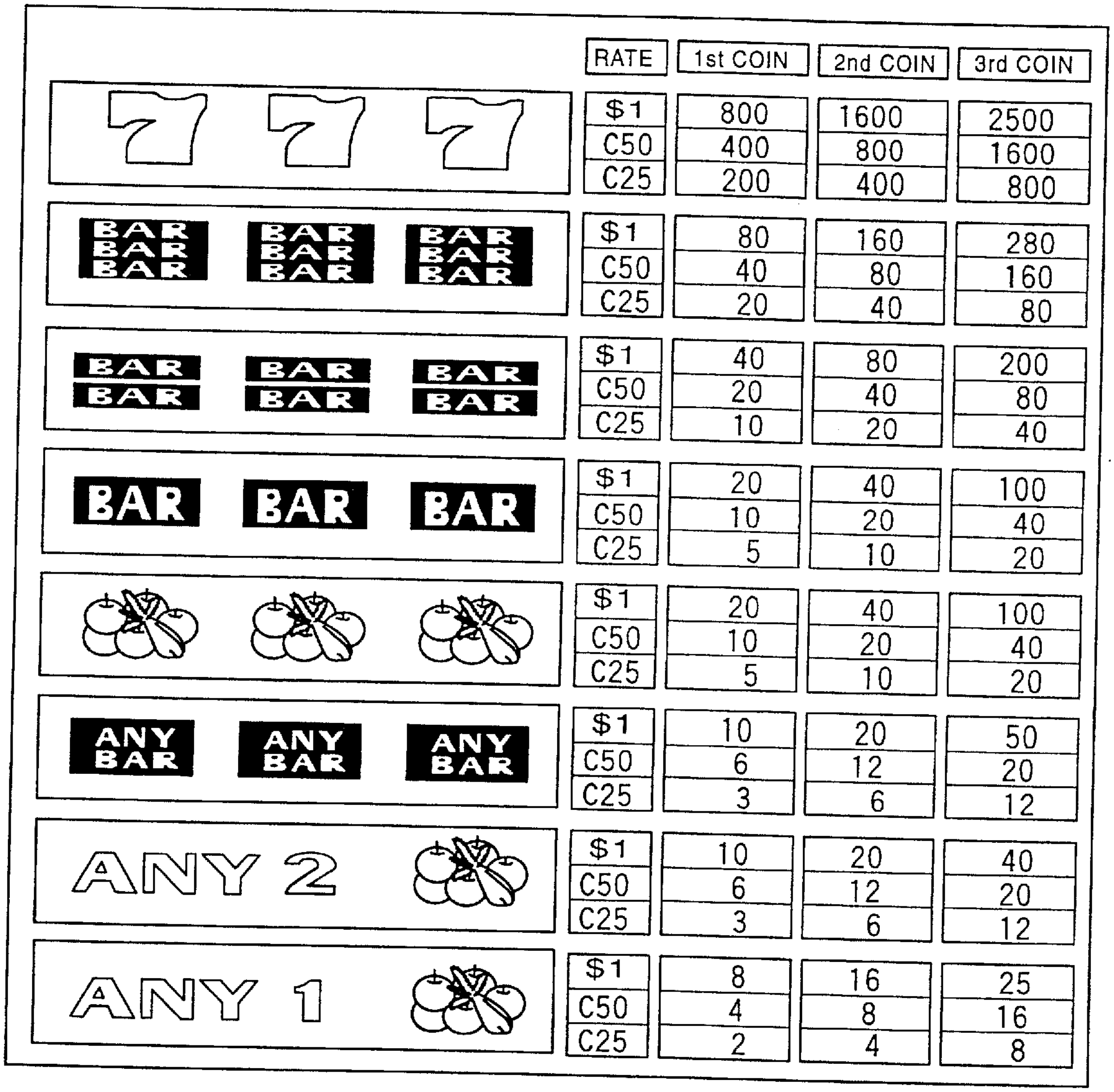
FIG. 2 is a diagram showing an example of an allocation table marked on the display panel shown in FIG. 1.

FIG. 2 is a diagram illustrating one example of an allocation table marked on the display panel 14 shown in FIG. 1.

In this embodiment of a slot machine, the prize allocation changes according to the number of coins input prior to starting the game (number of coins bet on the game). In FIG. 2, the "1st COIN" column indicates the allocation paid when one coin is inserted, the "2nd COIN" indicates the allocation paid when two coins are inserted, and the "3rd COIN" column indicates the allocation paid when three coins are inserted. The numbers in each of the allocation rows in FIG. 2 indicate the number of one dollar coins paid out.

Furthermore, in the slot machine according to the present invention, it is possible to play a one dollar-rate game, a 25 cent-rate game, or a 50 cent-rate game, while restricting the type of coin which can inserted to a one dollar coin, as described later. In FIG. 2, the "RATE" column shows the game rate; for example, when the combination of symbol marks shows "777" when two coins are bet in a 50 cent-rate game, then reference is made to the "2nd COIN" column in the "777" and "C50" rows. In this case, 800 one dollar coins are paid out, as shown in FIG. 2.

Figure 3:
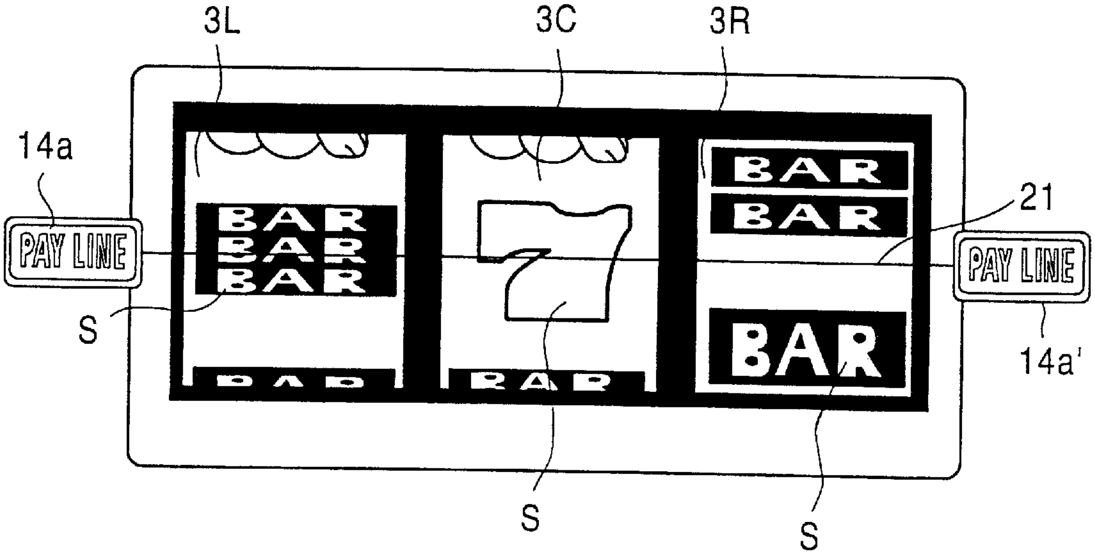
FIG. 3 is an external view showing in detail a reel viewing window section of the slot machine shown in FIG. 1.

FIG. 3 is an external view showing in detail the reel viewing window section in the slot machine illustrated in FIG. 1. In FIG. 3, lamps 14*a*, 14*a'* are shown, which light up when a coin is inserted, and the player can ascertain the prize status from the combination of symbols "S" stopped on a line 21 illuminated by lamps 14*a*, 14*a'*. It will be apparent to one of ordinary skill in the art that more than one lamp, and more or less than three reels, may be used on a slot machine according to the present invention.

Figure 4:
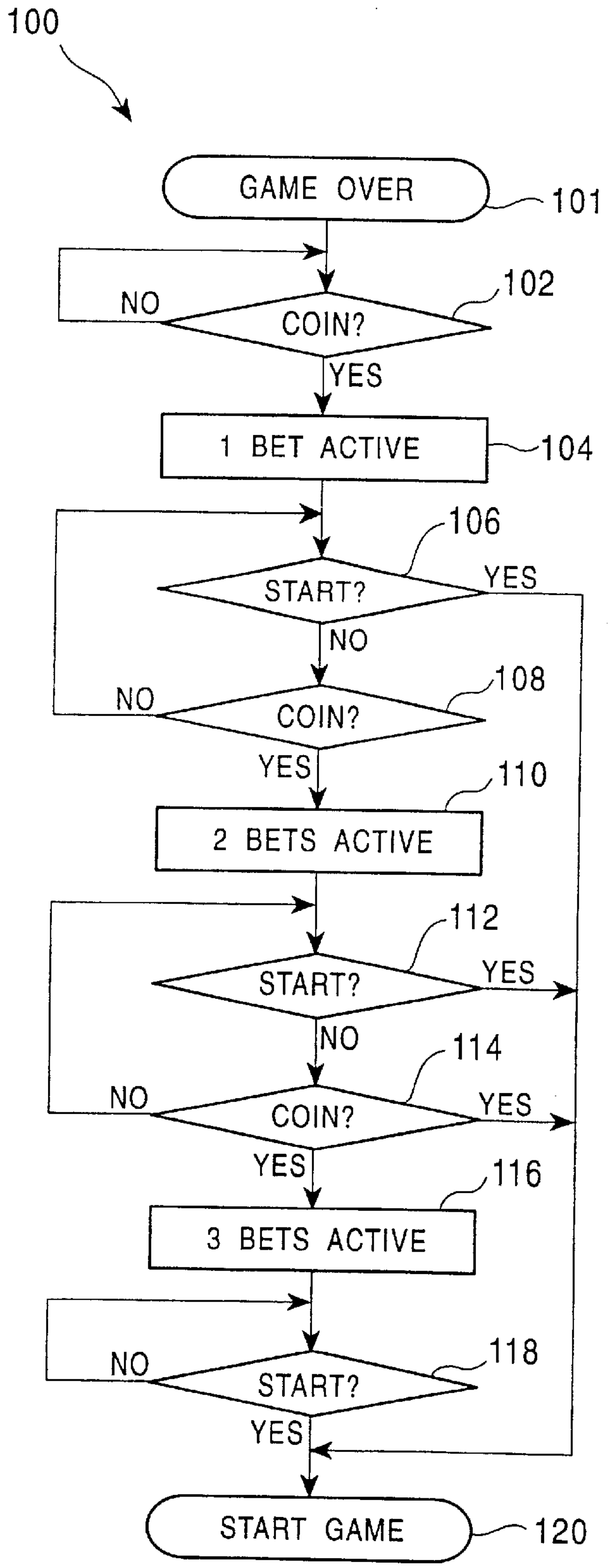
FIG. 4 is a flowchart of processing for determining valid winning lines.

As described in FIG. 2, in this slot machine, the prize allocation changes according to the number of coins inserted prior to the start of the game (number of coins bet on the game). This is determined in accordance with the flowchart illustrated in FIG. 4, for example, on the basis of the number of coins inserted as detected in the form of an electrical signal by a microswitch, photosensor, or the like, and a determination as to whether or not the start lever 5 or spin switch 8 has been operated. In FIG. 4, as well as causing the display lamps 14*a*, 14*a'* to light up, the "BET active" processing also generates an input signal to a microcomputer section described below for reference when determining the number of coins to be paid out when a prize is won.

Optionally, in the type of slot machine in which the prize status is determined by random selection using random numbers, a demonstration is made by unusual lights or sounds or by unusual operations when the randomly selected prize status is a "big jackpot" or when a "big jackpot" is missed by one reel symbol among all the reels, i.e., all but one of the reels are aligned in positions that would correlate to a "big jackpot" result (this condition of two matching symbols out of three reels, or of three matching symbols out of four reels if there are four reels, etc., is referred to as a "one-shy" condition). In one method for making this demonstration, reel lights may be provided on the reverse side of reel belts on which are imprinted the symbols around the reels, and these reel lights, which in conventional slot machines are flashed only when the prize status has been confirmed after all the reels have stopped, are flashed before all the reels stop.

Optionally, a slot machine may randomly select game result conditions from among a plurality of conditions before a plurality of reels, which are rotated at the start of a game, come to a stop. Such a slot machine is characterized by comprising reel light control means for flashing the reel lights on the inside, which illuminate the symbols imprinted on the circumference of the aforementioned plurality of reels when the randomly selected game results correspond to specific conditions, such as "big jackpot" or "small jackpot." A player is alerted by the reel light control means to the fact that the aforementioned randomly selected game results correspond to the aforementioned specific conditions.

Optionally, the aforementioned reel light control means flash the aforementioned reel lights when there are quasi-specific conditions, including, for example, one or more game result conditions, such as "one-shy", "two-shy", and "second game free," which are similar to the aforementioned specific conditions, among the aforementioned plurality of conditions, and the aforementioned quasi-specific conditions are randomly selected from among the aforementioned plurality of conditions. It will be apparent to one of ordinary skill in the art that this method of random selection of a prize result condition, and of demonstrating the prize result condition selected, may be combined with the systems and methods described herein for selecting a game rate and adjusting the prize probability based on the game rate selected.

FIG. 4 is a flowchart 100 illustrating the selection of lines to activate by lighting up one or more of the lamps 14*a*, 14*a'*. The selection may be made using a microswitch, a photosensor, or another similar electrical signal-based system for detection of the insertion of a token and determination as to whether or not the start lever 5, or the spin switch 8, or both, have been operated. In the flowchart 100, the line activation process starts at a step 101 indicating conclusion of a prior game. Following the step 101 is a test step 102 that determines whether a coin has been entered. The test step 102 is repeated until a coin is entered. Once a coin has been entered, control passes to a step 104 with one bet active. Following the step 104 is a test step 106 that determines whether the start lever 5 has been pulled. If the start lever 5 has been pulled, then the game proceeds to a game start step 120 and the game starts. Otherwise, a test step 108 determines whether a second coin has been entered. The test steps 106, 108 are repeated until either the start lever 5 is pulled or a second coin is entered. If a second coin is entered, control passes to a step 110 that indicates that two bets are active. Following the step 110, a test step 112 is performed to test whether the start lever 5 has been pulled. If the start lever 5 has been pulled, control passes from the step 112 to the game start step 120. Otherwise, a test step 114 is performed to determine whether a third coin has been entered. The steps 112, 114 are repeated until either the start lever 5 is pulled or a third coin is entered. If a third coin is entered, three bets are active in a step 116. A test step 118 is then performed to determine whether the start lever 5 has been pulled. If the start lever 5 has been pulled, then control passes to the game start step 120. Otherwise, the test step 118 is repeated.

Figure 5:
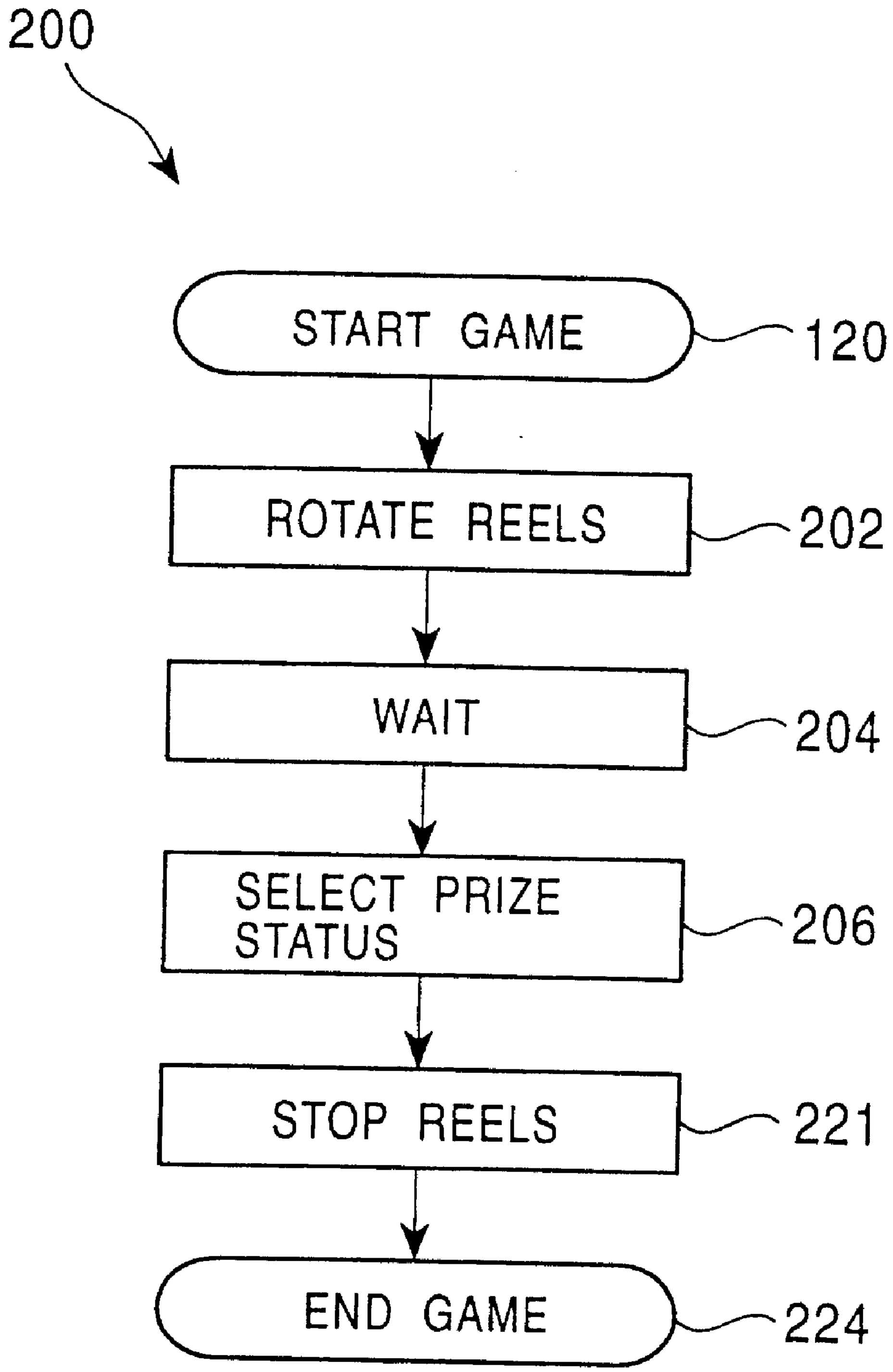
FIG. 5 is a flowchart showing the basic progress of a game in a slot machine according to the present invention.

The basic progress of the game after coins have been inserted and the game has been started in this way follows the flowchart shown in FIG. 5.

FIG. 5 is a flowchart 200 illustrating progress of the game once the number of bets active has been determined in accordance with the process shown in FIG. 4 (or by following one of a variety of conventional processes equivalent to that shown in FIG. 4). The game begins at the game start step 120 (of FIG. 4). A reel rotation step 202 follows the start step 120. Following the reel rotation step 202 is a wait step 204. Following the wait step 204 is a prize selection step 206 in which the prize status is selected. Following the prize status selection step 206 is a stop reels step 221 in which the reels are stopped, optionally in response to a player's pressing of stop buttons. After the step 221, control passes to a game end step 224.

In other words, the game is started by operation of the start lever 5 or spin switch 8, the three reels 4L, 4C, 4R rotate, and after a prescribed time period has elapsed, a prize status is selected, the reels 4L, 4C, 4R are stopped automatically based on the selected result, and the current game ends.

Figure 6:
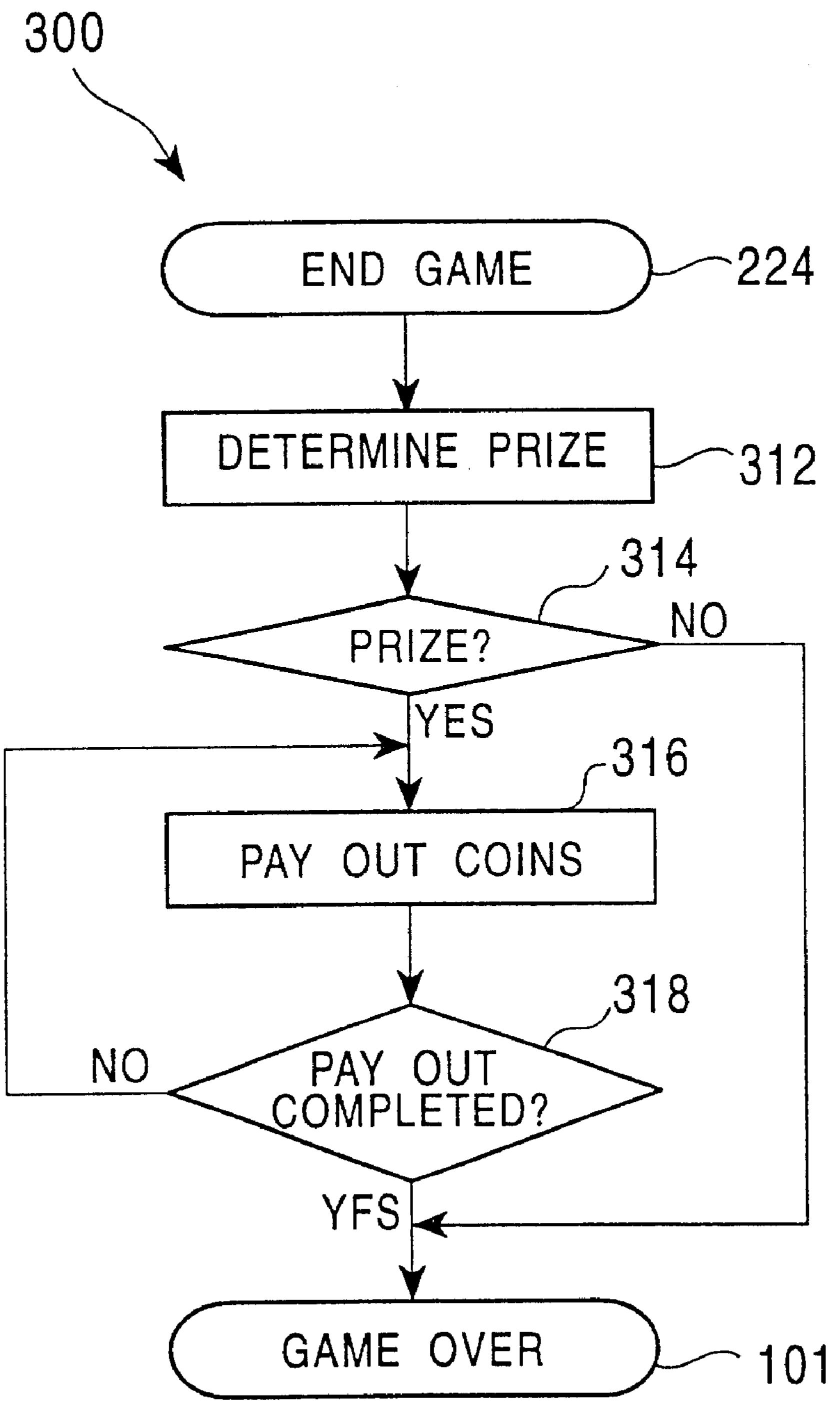
FIG. 6 is a flowchart showing processing from judgement of a win to the pay-out of coins.

When the game is over, prize determination processing is conducted in accordance with the flowchart in FIG. 6, for example, and processing for paying out coins is implemented when a prize has been won. In determining the prize, photoelectric signal components provided for each symbol on the reel are read by photosensors, for example, or in a device where the reels are driven by pulse motors, a signal component is provided in one position on each reel such that a reset pulse is obtained upon each revolution of the reel, thereby allowing it to be determined how many pulse signals have been supplied to the pulse motor after the production of the reset pulse until the reel stops.

The prize status is determined by comparing the combination of the symbols on each reel, in the form of code signals as mentioned previously, with a ROM described below. If a prize has been won, a hopper motor for paying out prize coins is driven to pay out the coins. The coins paid out are counted, for example, by means of a coin counter provided in the coin pay-out chute, and when the prescribed number of coins has been reached, the game is terminated.

FIG. 6 is a flowchart 300 illustrating the determination of the prize when the game is over. Following the game end step 224 (of FIG. 5), control passes to a step 312 in which determination of the prize is made. Following the step 312 is a test step 314 which tests whether a prize was won. If so, control passes to a step 316. Otherwise, control passes to the game over step 101 (of FIG. 4). In the step 316, the coins, or prize tokens, are paid out in the proper amount. Following the step 316 is a test step 318 in which it is determined whether the paying out has been completed. If so, control passes to the game over step 101. Otherwise, control returns to the step 316 and the process is repeated until the game over step 101 is reached.

Figure 7:
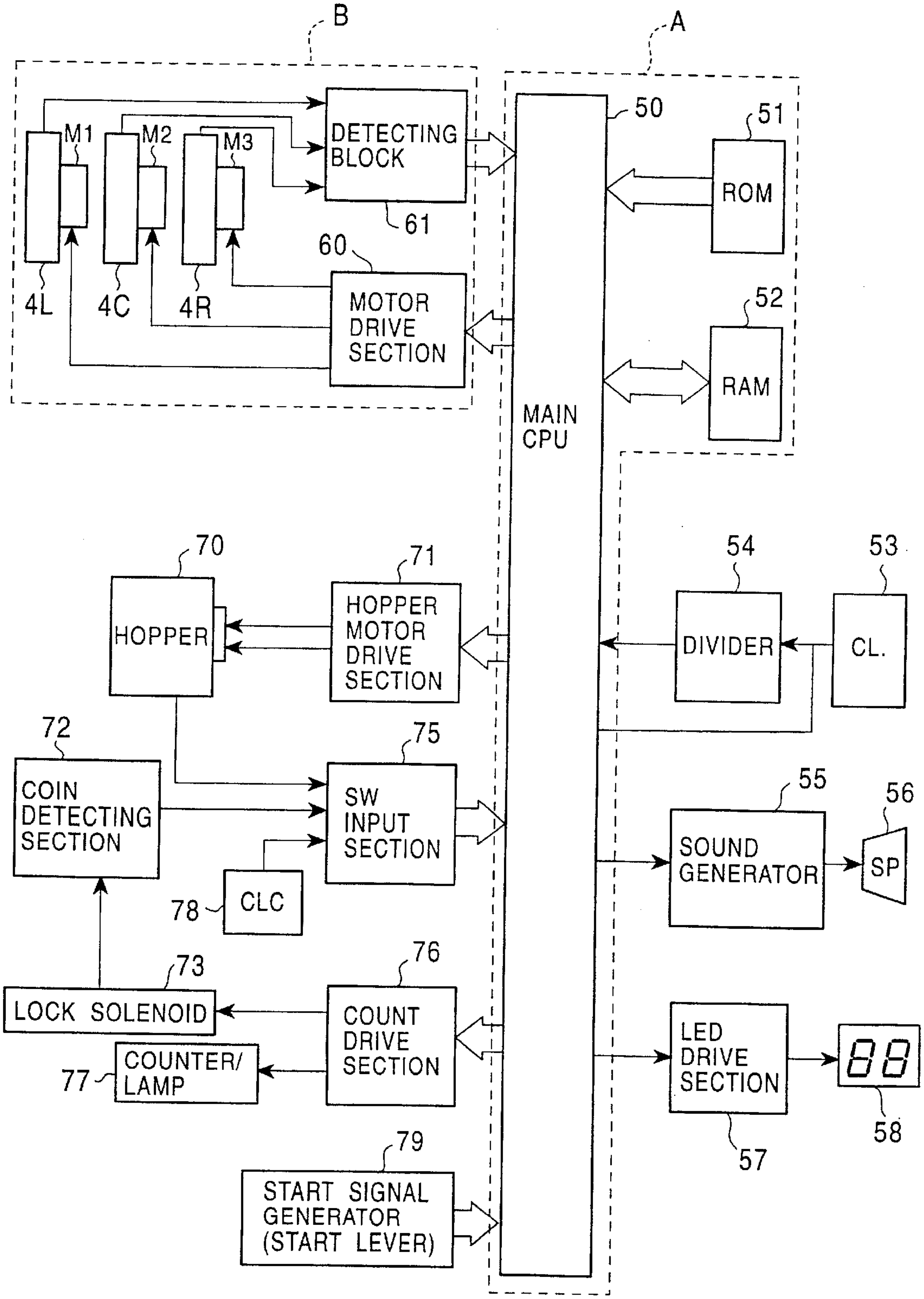
FIG. 7 is a block diagram showing a microcomputer section whereby a slot machine according to the present invention is controlled.

FIG. 7 is a block diagram of a microcomputer section which controls the slot machine according to the present embodiment.

In FIG. 7, block A marked by the broken line is a main control section comprising a main CPU 50, a ROM 51 and a RAM 52. The ROM 51 contains a table of the aforementioned symbols and their corresponding symbol codes and a table of symbol codes corresponding to prizes and the number of prize coins to be paid out, as well as a prize probability table, and the like, corresponding to the prize status when a prize is awarded for a game that has been played. The RAM 52 provides a random number store for temporarily recording the random numbers sampled after the start of the game, and a memory etc. for temporarily storing data, such as the rotating reel code numbers, symbol numbers, and the like. Preferably, the prize probability changes in accordance with the game rate, which may be changed by means of the rate changing switch. The prize probability may increase as the game rate increases. For example, the prize probability may increase linearly, exponentially, or in some other functional relationship, as the game rate increases.

A clock pulse generator 53 produces, for example, a 4 MHZ pulse and actuates the main CPU 50 by means of this reference pulse, and a divider 54 supplies an interruption pulse of 500 Hz, for example, to the main CPU 50 for the purpose of interrupt execution processing of a prescribed program. A sound generator 55 is driven so as to generate sounds via a speaker 56 in order to enhance the appeal of the game at appropriate times after the start of the game. An LED drive section 57 drives, for example, a seven-segment digital display light-emitting diode 58, and this is used for displaying the number of coins paid out, or the like. The digital display section 7 shown in FIG. 1 may be constituted by a seven-segment digital display light-emitting diode 58 in this way.

Block B marked by the broken line is a reel drive monitoring block. In the present embodiment, the reels 4L, 4C, 4R are driven respectively by pulse motors M1, M2, M3. The motors M1, M2, M3 are rotated by drive pulses from a motor drive section 60 and, for example, the reels 4L, 4C, 4R are rotated such that the symbol on a reel visible through window 3L, 3C, 3R is shifted by one symbol per pulse. Each reel is also constructed such that a reset signal is generated upon each revolution. A detecting block 61 detects this reset signal. In the main CPU 50, the number of drive pulses supplied to the motor after the detecting block 61 has detected a reset signal is counted, thereby enabling the reel symbols visible in the windows 3L, 3C, 3R to be identified.

A prize coin pay-out hopper 70 and a hopper motor drive section 71 also are provided. A coin detecting section 72 detects the insertion of coins prior to the start of a game. A signal for the number of coins paid out from the hopper 70 and a signal for the number of coins inserted from the coin detecting section 72 are transmitted from a count drive section 76 via a Sw input section 75 and the main CPU 50 to the counter or light 77, and the number of coins inserted or paid out is detected, or the display lamps on the active prize line are lit according to the number of coins inserted. When the number of coins inserted reaches three, a lock solenoid 73 is activated to lock the coin inlet. A further switch operating component 78, such as a pause switch, or the like, is operated when the player wishes to suspend a game after inserting coins. A start signal generating section 79 is constituted by the aforementioned start lever 5 or spin switch 8, or the like.

According to the system composition described above, the determination processing relating to the basic progress of the game, as illustrated in the aforementioned flowcharts, can be implemented by means of a prescribed executing program in the main CPU 50.

The composition of the slot machine according to the present embodiment is described further below.

Figure 8:
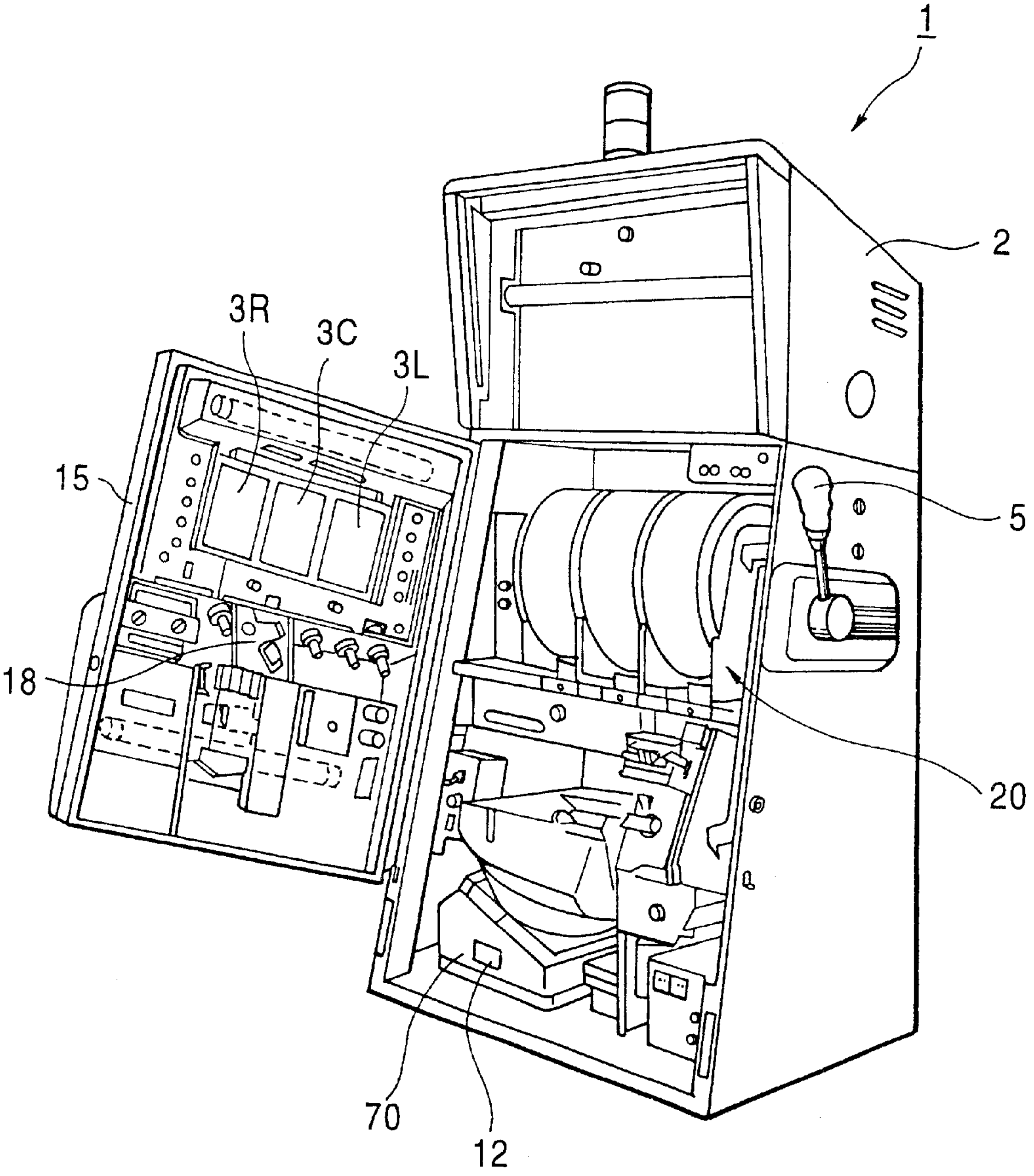
FIG. 8 is a diagram showing the slot machine main unit illustrated in FIG. 1 with the front door panel in an open state.

FIG. 8 is a diagram showing the main unit 1 of the slot machine illustrated in FIG. 1, with the front door panel 15 in an open state.

As described previously, windows 3L, 3C, 3R are provided in the front door panel 15, and a reel unit 20 comprising reels 4L, 4C, 4R is provided inside the cabinet 2 in a position facing the windows 3L, 3C, 3R.

A selector 18 is provided for sorting the inserted coins and ejecting coins of the wrong shape, such as invalid coins, false coins, and the like. A hopper 70 also is provided for ejecting coins paid out according to the game result. Coins inserted via the coin inlet 6 are sorted by the selector 18, and if a coin is valid, it is counted as part of the number of inserted coins and then supplied to the hopper, where it is retained. Coins discharged from the hopper 70 are paid out via the coin outlet 12 and collect in the coin receptacle 13.

In the present embodiment, the selector 18 and hopper 70 use one dollar coins. In other words, in a slot machine according to the present invention, it is possible to play a one dollar-rate game, 50 cent-rate game, and a 25 cent-rate game, while restricting the type of coin which can be inserted to a one dollar coin. It will be apparent to one of ordinary skill in the art that the invention may be readily modified to permit play at any rate that is a multiple of $1, such as, for example, a $2 rate game, a $5 rate game, a $10 rate game, etc., or a fraction of $1, such as, for example, a 1 cent rate game, a 5 cent rate game, or a 10 cent rate game, etc.

The player inserts a one dollar coin into the coin inlet 6 in the main unit 1 of the slot machine, and he or she can select the game rate by pressing the rate changing switch 17 illustrated in FIG. 1.

Figure 9:
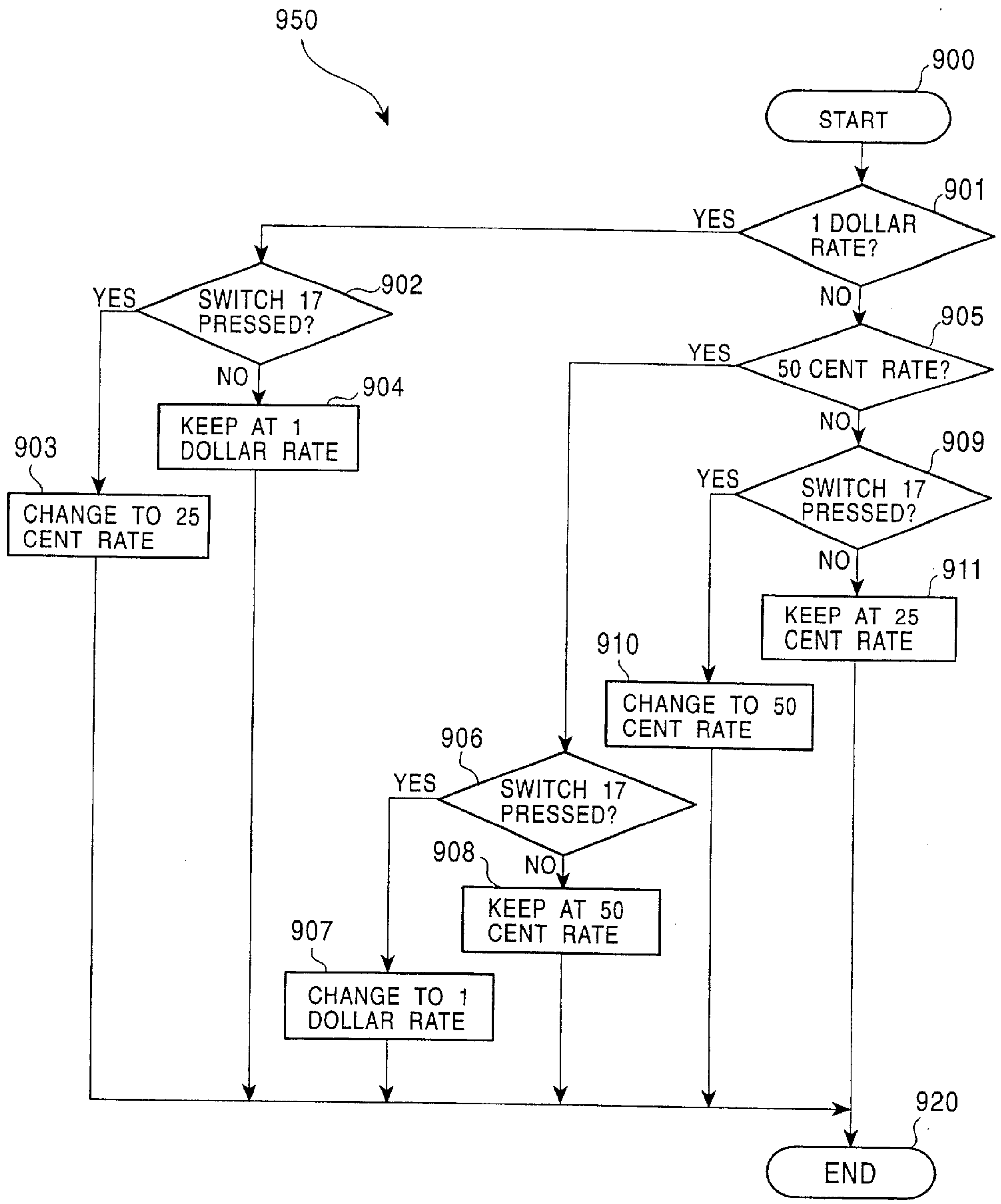
FIG. 9 is a flowchart of processing for changing a game rate.

FIG. 9 is a flowchart 950 of processing for changing the game rate. This processing is implemented by the CPU 50 illustrated in FIG. 7, for example. Firstly, following a start step 900, it is determined whether or not the current game rate is a one dollar rate in a step 901. If the current game rate is one dollar, then it is determined whether or not the rate changing switch 17 has been pressed in a step 902, and if it has been pressed, the current game rate is changed to 25 cents in a step 903, and if it has not been pressed, then the current game rate is kept at one dollar in a step 904.

At the rate determination step 901, if the current game rate is not one dollar, then it is determined whether or not the current game rate is 50 cents in a step 905. If the current game rate is 50 cents, then it is determined whether or not the rate changing switch 17 has been pressed in a step 906, and if it has been pressed, the current game rate is changed to one dollar in a step 907, and if it has not been pressed, the game rate is kept at 50 cents in a step 908.

At the step 905, if the current game rate is not 50 cents, then it is determined whether or not the rate changing switch 17 has been pressed in a step 909, and if it has been pressed, the current game rate is changed to 50 cents in a step 910, and if it has not been pressed, the current game rate is kept at 25 cents in a step 911. Following the step 903, the step 904, the step 907, the step 908, the step 910, or the step 911, the game rate determination process ends in a step 920.

Figure 10:
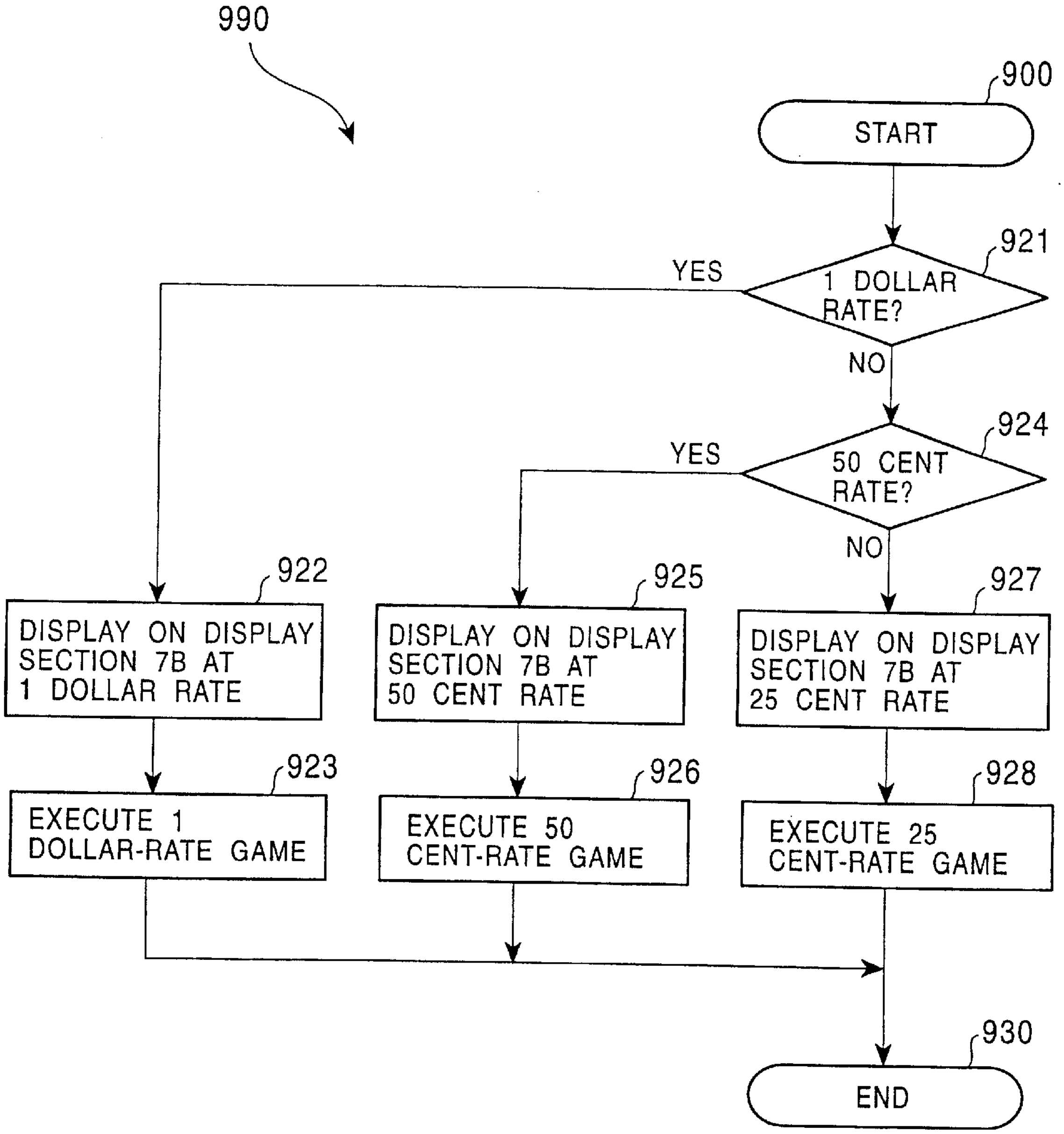
FIG. 10 is a flowchart for changing the game in accordance with the game rate.

FIG. 10 is a flowchart 990 of processing for switching a game according to the game rate. This processing is implemented by the CPU 50 shown in FIG. 7, for example.

Firstly, it is determined whether or not the current game rate set as illustrated in FIG. 9 is a one dollar rate in a step 921. If the current game rate is one dollar, then the number of credits at a one-dollar rate is displayed in figures in the converted credit number display 7B in a step 922. In other words, while the number of credited one dollar coins inserted by the player via the coin inlet 6 is displayed on the credit number display 7A, a number derived by converting the number of coins displayed on the credit number display 7A is shown on the converted credit number display 7A. In the case of a one dollar rate, the number shown on the credit number display 7A and the number shown on the converted credit number display 7B are the same. If a game is played in this state, then by pressing the single-bet switch 9 once, the number shown in the converted credit number display 7B is decremented by one, one dollar is bet on the game, and a one dollar-rate game can be played in a step 923.

In the step 921, if the current game rate is not one dollar, it is determined whether or not the current game rate is 50 cents in a step 924. If the current game rate is 50 cents, the number of credits is displayed in the converted credit number display 7B at a 50 cent rate in a step 925. In other words, while the number of credited one dollar coins inserted by the player via the coin inlet 6 is shown on the credit number display 7A, a number derived by converting the number shown in the converted credit number display 7A at a 50 cent rate is shown in converted credit number display 7B. In the case of a 50 cent rate, the number shown on the converted credit number display 7B is twice the number shown on the credit number display 7A. If a game is played in this state, then by pressing the single-bet switch 9 once, the number shown on the converted credit number display 7B is decremented by one, 50 cents is bet on the game, and a 50 cent-rate game can be played in a step 926.

At the step 924, if the current game rate is not 50 cents, the number of credits is shown in the converted credit number display 7B at a 25 cent rate in a step 927. In other words, while the number of credited one dollar coins inserted by the player via the coin inlet 6 is shown on the credit number display 7A, a number derived by converting the number shown on the credit number display 7A at a 25 cent rate is shown on the converted credit number display 7B. In the case of a 25 cent rate, the number shown on the converted credit number display 7B is four times the number shown on the credit number display 7A. If a game is played in this state, then by pressing the single-bet switch 9 once, the number shown on the converted credit number display 7B is decremented by one, 25 cents is bet on the game, and a 25 cent-rate game can be played in a step 928. Following the $1 rate execution step 923, the 50 cent rate execution step 926, or the 25 cent rate execution step 928 is an end step 930.

When the game is over, if the player wishes the credited coins that have been won to be paid out by the slot machine, then he or she should press the C/P switch 11 shown in FIG. 1. By doing this, a number of one dollar coins equal to the number shown in the credit number display 7A is paid out via the hopper 70 and the coin outlet 12.

In FIG. 5, it was described that the prize status is selected when the game is started. In this prize status selection process, prizes are determined on the basis of prescribed probabilities, but in the present invention, the prize probability used in this selection may also be varied according to the game rate. In other words, if the game rate is low, for instance, a 25 cent rate, then the prize probability can be set to a relatively low value, whereas if the game rate is high, for instance, a one dollar rate, then the prize probability can be set to a high value. By this means, it is possible to provide the player with an advantage when he or she plays a game at a higher game rate. In the embodiment described above, a rate changing switch 17 is provided in a position on the front surface of the front door panel 15 whereby it can be operated by the player such that, provided that there are coins in credit, the player can change the game rate according to his or her own wishes, but the present invention is not limited to this, and the rate changing switch 17 may be located on the rear face of the front door panel 15, for example, such that it can only be changed by employees of the outlet, such as a casino, or the like.

Furthermore, in the aforementioned embodiment, a slot machine accepting one dollar coins was described, but the present invention is not limited to this and it is possible to devise the machine such that coins of a different size to a one dollar coin, or bank notes, or tokens of different sizes or colors representing different monetary values, can be inserted. Coins, bank notes, and tokens will be referred to interchangeably herein as "value units".

Moreover, in the aforementioned embodiment, a slot machine allowing a one dollar-rate game, a 50 cent-rate game, and a 25 cent-rate game was described, but the present invention is not limited to this and it is possible to offer different game rates to one dollar, 50 cent and 25 cent rates, and it is also possible to switch between two types of game rate, or between four or more types of game rate.

In the aforementioned embodiment, a slot machine was described, but the present invention is not limited to this, and needless to say, it may be applied to any type of game machine which allows a game to be played, whereby coins are inserted and these coins are placed as a bet, such as a poker game machine, or the like.

While the invention has been disclosed in connection with the preferred embodiments shown and described in detail, various modifications and improvements thereon will become readily apparent to those skilled in the art. Accordingly, the spirit and scope of the present invention is to be limited only by the following claims.

What is claimed is:

1. A game machine comprising:

means for receiving coins as a bet;

means for selecting a betting unit value;

means, responsive to said means for selecting a better unit value, for selecting an amount bet that is a multiple of said betting unit value;

means, responsive to said means for selecting a betting unit value and said means for selecting an amount bet, for determining a prize probability specifying a probability at which a prize is awarded for each pay line, wherein said prize probability varies according to said betting unit value and said amount bet;

result selection means for randomly selecting game result conditions for a current game and at least one subsequent game;

storage means for storing said game result conditions for a current game and at least one subsequent game;

game result determining means, for providing a predetermined game result;

determining means for determining whether the results selected by said result selection means include at least one predetermined game of result provided by the game result determining means;

demonstration means, responsive to said determining means for indicating a higher probability of winning a prize based on the results selected by said results selection means for the current game and at least one subsequent game stored in said storage means;

actuator means, responsive to the game result determining means, for rotating a plurality of reels and for stopping the reels at a position that varies according to the predetermined game result, wherein said predetermined game result includes at least first and second possible outcomes, said first outcome corresponding to a win condition and said second outcome corresponding to a one-shy condition; and reel light means, responsive to the game result determining means, being actuated to indicate the predetermined game result prior to all of the reels coming to a stop, wherein, in response to the first outcome, said reel light means continues to actuate after all of the reels have come to a stop, and wherein, in response to the second outcome, said reel light means are unactuated when all of the reels have to come to a stop.

2. A game machine according to claim 1, wherein the betting unit value is smaller than the value of one of the inserted coins.

3. The game machine of claim 1, wherein said prize probability decreases as said betting unit value increases.

4. The game machine of claim 1, wherein said prize probability increases one of: linearly and exponentially as said betting value increases.

5. A method of playing a game comprising:

inserting coins as a bet wherein said coins are of only one type;

selecting one of a plurality of game rates;

selecting an amount to bet that is a multiple of said one of a plurality of game rates;

determining a prize probability for each pay line that varies according to said one of a plurality of game rates and said amount to bet;

randomly selecting game results for a current game and at least one subsequent game;

storing, in a storage area, the game results for a current game and at least one subsequent game;

providing a predetermined game result, wherein said predetermined game result includes at least first and second possible outcomes, said first outcome corresponding to a win condition and said second outcome corresponding to a one-shy condition;

demonstrating when the randomly selected game results include at least one predetermined game result for the current game and a predetermined game result for at least one subsequent game stored in said storage area;

rotating a plurality of reels;

stopping the reels at a position that varies according to the predetermined game result;

indicating the predetermined game result prior to all of the reels coming to a stop by actuating at least one reel light that is coupled to at least one of the reels;

in response to the first outcome, continuing to actuate the at least one reel light after all of the reels have come to a stop; and in response to the second outcome, unactuating the at least one reel light when all of the reels have come to a stop.

6. A game machine, comprising:

a coin inlet for inserting coins;

a selector for differentiating whether a coin inserted via the coin inlet is a valid coin;

a hopper for collecting coins determined by the selector to be valid coins and discharging the collected coins according to requirements;

a coin input counting section for counting the number of coins determined by said selector to be valid coins;

a rate changing switch for switching between a plurality of game rates to provide a selected game rate;

at least one betting switch, for selecting an amount to bet that is a multiple of said selected game rate;

a prize probability selector, responsive to said rate changing switch and said at least one betting switch, for selecting a prize probability that a bet is paid out for each pay line;

a main unit;

an actuator coupled to said main unit;

a result selector coupled to said main unit having a random result selection component which selects random results for a current game and at least one subsequent game, and a plurality of game result storage areas which store the random results;

a demonstrator indicator coupled to said main unit;

a game implementing section for implementing a game at the game rate set by said rate changing switch;

a plurality of rotatable reels that stop rotating at a position that varies according to a predetermined game result, wherein said predetermined game result includes at least first and second possible outcomes, said first outcome corresponding to a win condition and said second outcome corresponding to a one-shy condition;

an activator coupled to said demonstrator and responsive to said result selector whereby said activator activates said demonstrator when at least one of said game result storage areas contains a predetermined game result for the current game and at least one subsequent game stored in said game results storage areas; and reel lights, coupled to the reels, wherein, prior to all of the reels coming to a stop, at least one of the reel lights is actuated to indicate that the predetermined game result meets a specific game condition corresponding to at least one of said first and second outcomes, and wherein, in response to the first outcome, at least one of the reel lights is actuated after all of the reels have come to a stop and wherein, in response to the second outcome, the reel lights are unactuated when all of the reels have come to a stop.

7. A game machine according to claim 6, wherein said rate changing switch is provided in a position so it can be operated by the player such that the player can change the game rate.

8. A game machine according to claim 7, wherein the prize probability increases as the game rate increases.

9. A game machine according to claim 7, wherein the prize probability increases linearly as the game rate increases.

10. A game machine according to claim 6, wherein the prize probability increases as the game rate increases.

11. The game machine of claim 6, wherein said prize probability increases exponentially as said game rate increases.

12. The game machine of claim 6, wherein said prize probability decreases as said game rate increases.

13. A game machine, comprising:

an inlet, having an opening for receiving value units inserted by a player;

a token input counting section, responsive to the number of value units inserted into said inlet;

a rate changing switch for switching between a plurality of game rates to provide a selected rate;

at least one betting switch for betting an amount that is a multiple of said selected rate;

a prize determination device, responsive to said rate changing switch and said at least one betting switch, for determining whether a player has won a prize in accordance with a predetermined prize probability for each pay line;

a main unit;

an actuator coupled to said main unit;

a result selector coupled to said main unit having a random result selection component which selects random results for a current game and at least one subsequent game, and a plurality of game result storage areas which store the random results;

a game implementing section responsive to said rate changing switch and to said token input counting section; and a plurality of rotatable reels that stop rotating at a position that varies according to a predetermined game result, wherein said predetermined game result includes at least first and second possible outcomes, said first outcome corresponding to a win condition and said second outcome corresponding to a one-shy condition;

an activator coupled to said demonstrator and responsive to said result selector whereby said activator activates said demonstrator when at least one of said game result storage areas contains a predetermined game result for the current game and at least one subsequent game stored in said game results storage areas; and reel lights, coupled to the reels, wherein, prior to all of the reels coming to a stop, at least one of the reel lights is actuated to indicate that the predetermined game result meets a specific game condition corresponding to at least one of said first and second outcomes, and wherein, in response to the first outcome, at least one of the reel lights is actuated after all of the reels have come to a stop and wherein, in response to the second outcome, the reel lights are unactuated when all of the reels have come to a stop.

14. A game machine, according to claim 13, wherein said opening on said inlet is sized to receive coins.

15. A game machine, according to claim 13, wherein said opening on said inlet is sized to receive printed bills.

16. A game machine, according to claim 13, wherein said opening on said inlet is sized to receive tokens.

17. A game machine, according to claim 13, wherein said prize determination device pays back value units at a predetermined prize probability responsive to said changing switch and at least one betting switch.

18. A game machine, according to claim 13, wherein said rate changing switch is operable by a player.

19. A game machine, according to claim 13, further comprising:

a hopper, coupled to said inlet and responsive to said prize determination device, for collecting value units and discharging none or more of the collected value units depending on the prize result determined by said prize determination device.

20. A game machine, according to claim 13, wherein said prize determination device pays back value units at a predetermined prize probability responsive to said rate changing switch.

21. A game machine, according to claim 13, wherein the prize probability increases as the game rate increases.

22. A game machine, according to claim 13, wherein the prize probability increases linearly as the game rate increases.

23. The game machine of claim 13, wherein said predetermined prize probability decreases as said game rate increases.

24. The game machine of claim 13, wherein said predetermined prize probability increases exponentially as said game rate increases.

25. A game machine, comprising:

inlet means for receiving value units inserted by a player;

selector means for determining whether a value unit is valid;

hopper means for collecting value units and for discharging value units;

value unit input counting section means for counting the number of value units determined by said selector means to be valid;

rate changing switch means for switching between a plurality of game rates to provide a selected rate;

betting means for betting an amount that is a multiple of said selected rate;

prize probability means, responsive to said rate changing switch means and said betting means, for determining a probability for each pay line that a prize is paid out to the player;

game implementing section means for implementing a game at the game rate set by said rate changing switch means;

result selection means for randomly selecting game result conditions for a current game and at least one subsequent game;

storage means for storing same game result conditions for a current game and at least one subsequent game;

game result determining means, for providing a predetermined game result;

determining means for determining whether the results selected by said result selection means include at least one predetermined game of result provided by the game result determining means;

demonstrating means, responsive to said determining means for indicating a higher probability of winning a prize based on the results selected by said results selection means for the current game and at least one subsequent game stored in said storage means;

actuator means, responsive to the game result determining means, for rotating a plurality of reels and for stopping the reels at a position that varies according to the predetermined game result, wherein said predetermined game result includes at least first and second possible outcomes, said first outcomes corresponding to a win condition and said second outcome corresponding to a one-shy condition; and reel light means, responsive to the game result determining means, being actuated to indicate the predetermined game result prior to all of the reels coming to a stop, wherein, in response to the first outcome, said reel light means continues to actuate after all of the reels have come to a stop, and wherein, in response to the second outcome, said reel light means are unactuated when all of the reels have come to a stop.

26. The game machine of claim 25, wherein said probability decreases as said game rate increases.

27. The game machine of claim 25, wherein said probability increases as one of: linearly and exponentially as said game rate increases.

28. A method of playing a game, comprising:

receiving value units inserted by a player;

counting the number of value units received;

selecting a game rate from among a plurality of game rates to provide a selected game rate;

betting an amount that varies according to a multiple of the selected game rate;

determining whether the player has won a prize in accordance with a predetermined prize probability for each pay line depending on the selected game rate and the amount bet;

implementing the game at the game rate selected based on the number of value units received;

randomly selecting game results for a current game and at least one subsequent game;

storing in a storage area, the game results for a current game and at least one subsequent game;

providing a determined game result, wherein said predetermined game result includes at least first and second possible outcomes, said first outcome corresponding to a win condition and said second outcome corresponding to a one-shy condition;

demonstrating when the randomly selected game results include at least one of a predetermined game result for the current game and a predetermined game result for at least one subsequent game stored in said storage area;

rotating a plurality of reels;

stopping the reels at a position that varies according to the predetermined game result;

indicating the predetermined game result prior to all of the reels coming to a stop by actuating at least one reel light that is coupled to at least one of the reels;

in response to the first outcome, continuing to actuate the at least one reel light after all of the reels have come to a stop; and in response to the second outcome, unactuating the at least one reel light when all of the reels have come to a stop.

29. A method, according to claim 28, wherein counting includes counting the number of valid value units received.

30. A method, according to claim 28, wherein selecting a game rate includes providing a player-operable switch for selecting a game rate from among a plurality of game rates.

31. A method, according to claim 28, further comprising:

determining whether the player has won a prize.

32. A method, according to claim 31, wherein determining includes determining at a predetermined prize probability depending on the game rate selected.

33. A method, according to claim 28, further comprising:

determining whether a value unit received is a valid value unit.

34. A method, according to claim 28, wherein said predetermined prize probability increases as the game rate selected increases.

35. A method, according to claim 28, further comprising:

extinguishing the coupled reel light when the corresponding reel stops and the predetermined game result does not include one of: “big jackpot” and “one shy”.

36. The method of claim 28, wherein said predetermined prize probability increases as one of: linearly and exponentially as said game rate increases.

37. The method of claim 28, wherein said predetermined prize probability decreases as said game rate increases.

* * * * *